(12) United States Patent
Donders et al.

(10) Patent No.: US 7,335,898 B2
(45) Date of Patent: Feb. 26, 2008

(54) METHOD AND APPARATUS FOR FLUORESCENT CONFOCAL MICROSCOPY

(75) Inventors: Paul Donders, Stoney Creek (CA); Carlos Zarate, Hamilton (CA); Pavel A. Fomitchov, New York, NY (US)

(73) Assignee: GE Healthcare Niagara Inc., Ontario (CA)

( * ) Notice: Subject to any disclaimer, the term of this patent is extended or adjusted under 35 U.S.C. 154(b) by 195 days.

(21) Appl. No.: 11/184,444

(22) Filed: Jul. 19, 2005

(65) Prior Publication Data
US 2006/0017001 A1    Jan. 26, 2006

(51) Int. Cl.
*G01N 21/64* (2006.01)
(52) U.S. Cl. .................. 250/458.1; 250/459.1; 250/461.1
(58) Field of Classification Search ............ 250/458.1, 250/459.1; 359/385
See application file for complete search history.

(56) References Cited

U.S. PATENT DOCUMENTS

| | | | | |
|---|---|---|---|---|
| 5,535,052 A * | 7/1996 | Jorgens | .................... | 359/388 |
| 5,612,818 A * | 3/1997 | Kumagai et al. | .......... | 359/385 |
| 5,981,956 A * | 11/1999 | Stern | ..................... | 250/458.1 |
| 6,094,300 A * | 7/2000 | Kashima et al. | ............ | 359/385 |
| 6,804,000 B2 * | 10/2004 | Roorda et al. | .............. | 356/318 |
| 2003/0035301 A1 * | 2/2003 | Gardiner et al. | ............ | 362/583 |
| 2003/0036855 A1 | 2/2003 | Harris et al. | | |
| 2003/0128424 A1 * | 7/2003 | Motomura et al. | ........ | 359/385 |
| 2003/0142292 A1 * | 7/2003 | Wolleschensky et al. | ..... | 356/73 |
| 2004/0031930 A1 | 2/2004 | Wolleschensky et al. | | |
| 2006/0012871 A1 * | 1/2006 | Funk et al. | ................. | 359/385 |
| 2006/0140462 A1 * | 6/2006 | Saggau et al. | ............. | 382/128 |

FOREIGN PATENT DOCUMENTS

| WO | WO 04/036898 | 4/2004 |
|---|---|---|
| WO | WO 04/038461 | 5/2004 |

OTHER PUBLICATIONS

Bullen, et al. ("High-Speed, Random-Access Fluorescence Microscopy: I. High-Resolution Optical Recording with Voltage-Sensitive Dyes and Ion Indicators." Biophysical Journal 73 (1997): 477-491).*

Dierickx, B., et al., "Random Addressable Active Pixel Image Sensors", Proc. SPIE vol. 2950, Advanced Focal Plane Arrays and Electronic Cameras, p. 2-7 (1996).

Ricquier, N., et al., "Active Pixel CMOS Image Sensor with On-Chip Non-Uniformity Correction", IEEE Workshop on CCDs and Advanced Image Sensors, California, Apr. 20-21, 1995.

* cited by examiner

*Primary Examiner*—David Porta
*Assistant Examiner*—Casey Bryant
(74) *Attorney, Agent, or Firm*—Dwayne L. Bentley

(57) ABSTRACT

A new and improved confocal fluorescence microscope is presented. The new microscope has significant advantages relative to existing implementations of microscope confocal imagers. In common with previous confocal imagers the instant invention has the advantages relative to conventional wide-field and confocal fluorescence imagers, however it addresses the drawbacks of confocal technology in terms of cost and complexity, and provides significant savings in both due to the simplicity of the components and the elimination of the need of, in particular, spatial filters such as pinholes or slits.

37 Claims, 2 Drawing Sheets

METHOD AND APPARATUS FOR FLUORESCENT CONFOCAL MICROSCOPY

BACKGROUND OF INVENTION

The present invention relates to the area of optical microscopy, more specifically, the area of confocal fluorescence microscopy, and methods of obtaining images of fluorescently labelled targets by confocal fluorescence microscopy.

Generally, most fluorescence microscopes can be categorized into one of the following general classes based on how the fluorescent image information is captured and processed:

Wide-field Microscopes

In these microscopes, the target is imaged using a conventional wide-field strategy as in any standard microscope, and collecting the fluorescence emission. Generally, the fluorescent-stained or labelled sample is illuminated with excitation light of the appropriate wavelength(s) and the emission light is used to obtain the image; optical filters and/or dichroic mirrors are used to separate the excitation and emission light.

Structured Light Microscopes

This is a modification of a microscope that provides an enhanced spatial resolution along an optical axis of the microscope. This feature allows for optical sectioning of the imaging specimen. The major component of the structured light illumination device is a one-dimensional optical grid. The grid pattern is systematically projected onto the specimen and is moved in the focal plane of the objective across the sample; the emission light is collected and compiled to create the image. One such "structured-light" image is generated after processing of three images of the specimen captured for different positions on the grid.

Ordinarily, the projected image of the grid provides a strong spatial modulation of the intensity for the object in the focal plane of the objective while the intensity modulation in the area above and below the focal plane is significantly reduced. As the emission radiation is collected, the image processing algorithm eliminates the weaker signals from above or below the primary image plane as defined by the grid. The resulting image is, thus, free of any stray light or out of focus data. Further, because the structured light illumination device utilizes the illumination source of the host wide-field microscope, all fluorescence capabilities of that microscope are maintained.

True Confocal Microscopes

Confocal microscopes utilize specialized optical systems for imaging. In the simplest system, a laser operating at the excitation wavelength of the relevant fluorophore is focused to a point on the sample; simultaneously, the fluorescent emission from this illumination point is imaged onto a small-area detector. Any light emitted from all other areas of the sample is rejected by a small pinhole located in front to the detector which transmits on that light which originates from the illumination spot. The excitation spot and detector are scanned across the sample in a raster pattern to form a complete image. There are a variety of strategies to improve and optimize speed and throughput which are well known to those skilled in this area of art.

Line-confocal Microscopes

This is a modification of the confocal microscope, wherein the fluorescence excitation source is a laser beam; however, the beam is focused onto a narrow line on the sample, rather than a single point. The fluorescence emission is then imaged on the optical detector through the slit which acts as the spatial filter. Light emitted from any other areas of the sample remains out-of-focus and as a result is blocked by the slit. To form a two-dimensional image the line is scanned across the sample while simultaneously reading the line camera. This system can be expanded to use several lasers and several cameras simultaneously by using an appropriate optical arrangement.

However, such line confocal microscopes are typically complex and costly, and thus not practical for many applications. There exists a real need for microscopes which combine the advantages of confocal and line confocal microscopes with the simplicity and economy of other systems.

SUMMARY OF INVENTION

The instant invention presents a new and improved confocal fluorescence microscope. The new microscope has significant advantages relative to existing implementations of microscope confocal imagers. In common with previous confocal imagers the instant invention has the advantages relative to conventional wide-field and confocal fluorescence imagers. However, the instant invention also addresses the drawbacks of confocal technology in terms of cost and complexity, and provides significant savings in both due to the simplicity of the components and the elimination of the need, for example, of the physical spatial filters such as pinholes or slits. The system is also compatible with a wide range of micro well plates including thin-bottom 96, 386, and 1536-well plates, microscope slides, and can support for a wide range of fluorescent dyes.

The system comprises at least one, or more preferably two or more optical sources (preferably lasers) which will operate at different excitation wavelengths aligned with corresponding fluorescent or fluorescently stained or labelled targets. The fluorescent emission from each target is filtered using bandpass optical filters and the emission data is collected by at least one imaging device, preferably two or more imaging devices. The system presents certain distinct advantages over the prior wide-field fluorescence microscopes described above, including improved image quality and increased sensitivity. More specifically, in ordinary fluorescence microscopy, emission from the material above and below the focal plane fluoresces results in undesirable background fluorescence. Conventional wide-field fluorescence microscopes do not provide effective suppression of this background and, consequently, such microscopes will produce a relatively small signal from the target cellular material which "rides-on-top" of, and is affected by, a larger background signal. For example, when a microtiter plate with a biological sample is imaged by a wide field fluorescence microscope, background from the clear plastic bottom of the well-plate and the media above the cellular material will ordinarily be substantially greater than the signal of cellular material. Analysis of such images is routinely accomplished by estimating and then subtracting this background.

However, this estimation introduces the following problems:

1. The statistical noise in the signal of interest is increased as a result of the background. This reduces the ability to identify features of interest because such background fluorescence is typically responsible for >90% of the noise in the image and must be corrected for by estimating the contribution of the background noise. Further, because this estimation involves certain assumptions, this complicates analysis and interpretation and it decreases the sensitivity of the system.

2. Estimating and removing background is computationally expensive and takes a significant amount of time. Typically, in such systems ~50% of the analysis time is devoted to estimating the background. For cases where the background has irregular and high contrast structure (e.g. an assay where highly fluorescent particulates are floating in the media) a significant portion of an image might be effectively difficult to analyse because no accurate model of the background can be constructed.

The use of a confocal imaging microscope will typically suppress this background fluorescence by a factor of 20 to 100 relative to the fluorescence signal from the focal plane, thereby permitting a more accurate image to be obtained. However, confocal microscopes are often costly and complex to operate and use. The instant system reduces the cost and complexity of the system by introducing a simplified detection sub-system comprising one or more detector capable of random access for detecting the fluorescent emission. The detector is preferably a low cost, CMOS optical sensor which minimizes the contribution due to the dark current to negligible, even when the sensor is operated at room temperature, however other pixel-based detectors, such as appropriate CCD cameras can also be used. Suitable detection devices are described in *CMOS Imagers: From Phototransduction to Image Processing*, Orly Yadid-Pecht and Ralph Etienne-Cummings (Editors), Springer (Publisher), 1st editon (May 31, 2004), incorporated herein by reference.

In a preferred embodiment, the detector also incorporates a rolling shutter means to limit the instantaneous area of the detector used for light detection. The size of this area (such as the width of the rolling shutter in case of line-confocal imaging) will typically be less than or equal to the area of illumination optically conjugated to the detector.

Further, the system employs at least one, and preferable two or more, light sources to provide the excitation light. Virtually any source capable of emitting light, such as lamps, with or without filters, can be used. Such light sources would be well understood by those skilled in the art. Preferred light sources include brighter and narrow-band light sources, more preferably lasers, for such illumination.

In a preferred embodiment, the excitation light is focused on the target in the form of a line rather than a single point, and the line is scanned across the surface of the target. As discussed previously, line confocal imagers are known in the art, and the preferred system this confers the benefits of the conventional line system without the complexity and cost. The line-shaped illumination area on the imaging target can be produced by any means known to those in the art, but is preferably produced by a Powell lens.

In a further preferred embodiment, the line forming means is paired with a CMOS detector that is operated in the rolling shutter mode to produce a low cost, simple, and easy to use line confocal scanner The detector can also incorporate narrow-band laser-line-specific filters which can be used to reject the excitation light. These types of filters can be used in combination with other filters that have an optical bandwidth adjusted to an emission spectrum of the fluorophore. One preferred combination is to use a Rugate notch filter in series with a Schott Veril linear variable filter. By appropriate control of the position of the linear filter in front of the optical detector it is possible to image several fluorophores using the same excitation laser.

Also, the flexibility permits construction of a hybrid microscope which can operate in a plurality of modes. In a preferred embodiment of such a hybrid device, one mode of operation the hybrid microscope is a line-confocal microscope that will operate in the manner of the instant invention, in a second mode of operation the hybrid microscope will operate as a standard wide-field microscope when the illumination system is adjusted to illuminate the whole field view of the microscope.

DETAILED DESCRIPTION OF THE INVENTION

Figure 1:
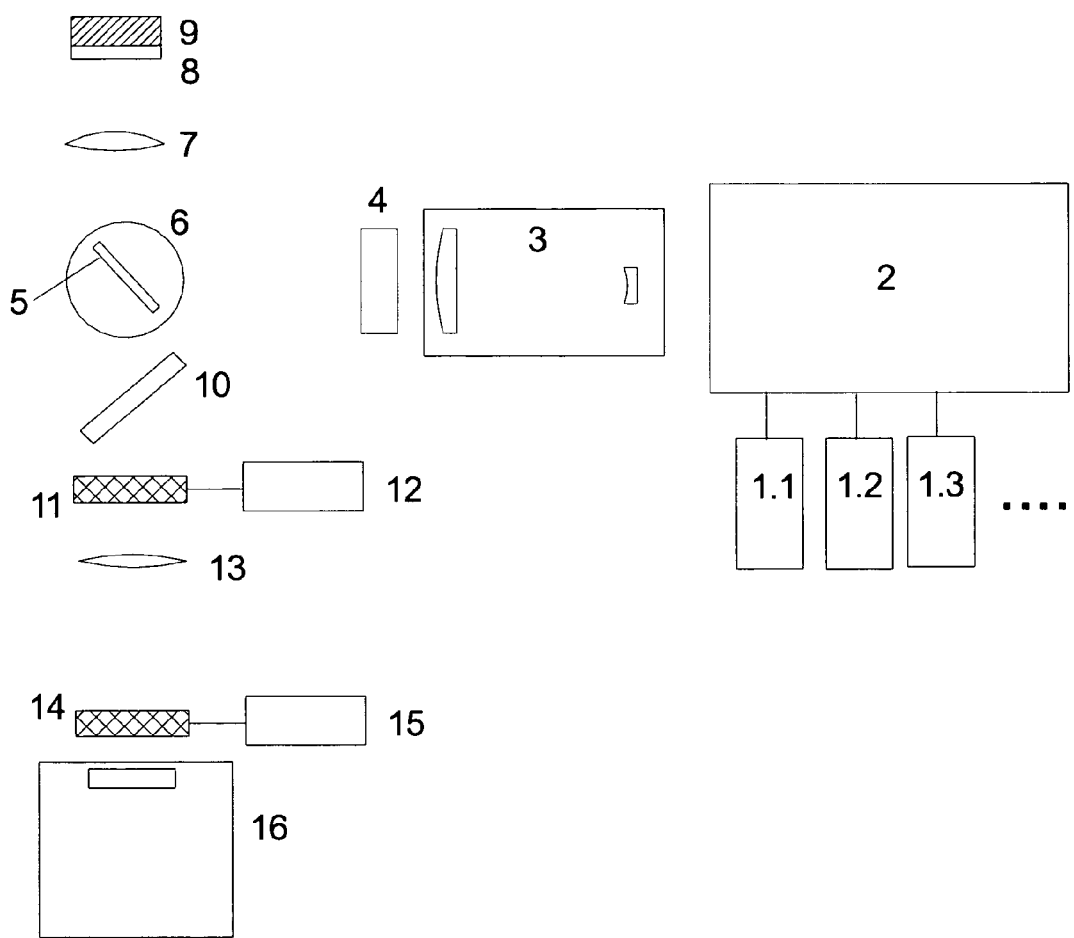
FIG. 1 presents a schematic diagram of a preferred apparatus of this invention.

The instant confocal imaging system described previously, is schematically presented in FIG. 1, and includes, as described previously one or more light sources to excite a fluorescent (or fluorescently stained or labelled) target and a one or more detectors to detect fluorescent emissions. The system may contain other components as would ordinarily be found in confocal and wide field microscopes. The following sections describe these and other components in more detail. For a number of the components there are multiple potential embodiments. In general the preferred embodiment depends upon the target application. For the purpose of this document the preferred target application is a high throughput cellular screening with the ability to image a wide range of fluorophores.

Description of Components

Laser Sources

While the light source can, as described previously, be any source capable of delivering light of the excitation wavelength to the target, preferably one or more excitation lasers are incorporated into the system. In a preferred embodiment there are 4+ lasers covering the optical spectrum from the near IR to the near UV. The light from each of these lasers can be coupled to the rest of the optical train by either delivering the light as a free space beam of the appropriate diameter, direction and degree of collimation or via fiber optic light delivery system. In a further preferred embodiment the light is delivered as a highly collimated beam with a specified beam diameter (standard methods can be used to achieve this) or via an optical fiber (ideally a single-mode polarization preserving fiber is employed). In a preferred embodiment each excitation laser operates in TEM00 mode, with M2<1.2, RMS noise 1 Hz to 10 MHz<0.5%, and with polarization in a defined state. Any practical number of lasers can be used.

Laser Selection Module

The excitation laser light is delivered to a laser-selection module (2). This module selects light from one of the lasers and directs it into a beam-shaping module (3). Light from other lasers is blocked. Possible embodiments of the laser-selection module include, but are not limited to:

1. A dispersive prism plus an optical shutter for each laser. The desired laser is selected by closing all shutters but one.
2. A reflective grating plus an optical shutter for each laser. The desired laser is selected by closing all shutters but one.

3. A stack of dichroic mirrors plus an optical shutter for each laser. The desired laser is selected by closing all shutters but one for laser.
4. A fiber optic switch.
5. A rotating mirror based beam deflector. A rotating mirror can be used to direct light from a selected laser to a beam shaping module. In this case all laser beams are (i) aligned to be in the same optical plane normal to the rotation axis of the mirror and (ii) pointed at the mirror to the point located on the rotational axis of the mirror. The desired laser is directed to the beam shaping module by adjusting the rotation angle of the mirror using a mechanical actuator such as a galvanometer. This is the preferred embodiment because it is simple, low in cost, and provides the ability to dynamically correct for drift in the direction of the output beams of lasers.

Beam Shaping Module

The excitation laser light is preferably appropriately shaped by a beam shaper (3). Possible embodiments of the beam shaper include, but are not limited to a laser beam expander. In a preferred embodiment a beam expander is used and its optical elements are corrected for chromatic aberration so as to minimize adjustment to the focus of the beam-expander when switching between lasers. The diameter of the laser beam is preferentially expanded to be equal to that of the rear pupil of the objective (7). In alternative embodiments, the type of beam-expander employed will depend upon the specific application and can include an anamorphic prism followed by a laser beam-expander without any beam shaper, and a chromatic aberration-free mirror-based beam expander.

Line Forming Module

For operation in a line confocal mode, the excitation laser light passes through a line-forming element (4) that converts the collimated beam of laser light into a focused beam diverging in one direction only. The full divergence angle of the output beams $\Delta\theta$ is given by:

$$\Delta\theta = 2 * \arctan(D/(2*f)) \quad (1)$$

where f is the focal length of the objective (7), and D is the linear dimension of the imaging area on the target (8) in the direction perpendicular to the plane of FIG. 1.

Preferred embodiments of the line-forming element include, but are not limited to, a Powell lens (as described U.S. Pat. No. 4,826,299, incorporated herein by reference).

The shape of the second conic-cylindrical surface is preferably specified to achieve both uniform illumination to within 10% over the range $\Delta\theta$ and more than 80% transmission of the laser light through the objective (7).

Alternative line forming elements such as cylindrical lenses, diffraction gratings, and holographic elements can also be used.

Scanning Module

The scanning module provides the scanning of the excitation light in the focal plane of the objective across the field of view of the microscope.

The excitation laser light is preferably reflected by a mirror (5) that can be tilted about an axis in the plane of FIG. 1. The angle of the tilt is set by an actuator (6). The mirror (5) may optionally include a narrow mirror centered on, or axially offset from, the rear of the objective (7). This is a preferred embodiment, and has a preferred geometry and reflective property as follows:

Width ~1/10 times the diameter of the rear aperture of the objective.

Length ~1.6 times the diameter of the rear aperture of the objective.

Optically flat.

Highly reflective 300 nm to 800 nm.

These particular properties of the mirror provide several key advantages:

(1). It makes it possible to use a single mirror for all excitation wavelengths. Relative to a multiband dichroic mirror this greatly increases the flexibility in adapting the system to a wide range of lasers.

(2). It uses the rear aperture of the objective at its widest point. This leads to the lowest achievable level of diffraction which in turn yields the narrowest achievable width of the line of laser illumination at the sample.

The field of view that can be achieved is large as is possible with the simple one-tilting-mirror strategy. By using two mirrors one can simultaneously change the direction of the beam and translate the beam.

The system can also be used with an optional dichroic mirror. The design of the dichroic mirror will be such that the radiation from all excitation lasers is efficiently reflected, and that light in the wavelength range corresponding to fluorescence emission is efficiently transmitted. A multi band mirror based on Rugate technology is a preferred embodiment.

Scanning Actuator

Embodiments of the actuator (6) include, but are not limited to, a galvanometer with an integral sensor for detecting the angular position. The galvanometer is driven by a suitably-tuned servo system. The bearing system is based on flexures to effectively eliminate wear and issues with friction in the bearing. This is the preferred embodiment.

Microscope Objective

The excitation laser light preferably passes through an objective (7). In this embodiment the objective:

Is highly corrected for geometric and chromatic aberrations over the desired field of view.

Has good flatness of field.

Transmits light from the near UV to the near IR.

Has the highest practical Numerical Aperture in order to achieve the best practical optical resolution and in order to collect as much of the fluorescence emission as practical.

Includes provision for correcting for the spherical aberration introduced by the sample-to-sample variation in the optical thickness of the sample support (8).

Has a working distance of at least 1.2 mm so as to be able to image samples through a sample support (8) of up to 1.5 mm in thickness without risk of the objective making contact with the support.

A preferred embodiment includes a Plan-Fluor objective with a spherical-aberration collar. For the preferred embodiment an objective will have a magnification in the range 15× to 30× and a focal length in the range 6.7 mm to 13.3 mm.

In a preferred operation, the excitation laser light passes through a solid, transparent optical material (8) that supports the sample. The thickness, curvature and optical properties of this supporting material may vary from sample-to-sample. The excitation laser light is incident on the sample (9). When the system is properly focused the sample is illuminated by a line of laser light. Fluorescent material in the sample emits fluorescent light as a result of illumination by the line of light. In the preferred embodiment the distance over which the line of illumination is uniform will exceed 0.8 mm.

The fluorescent light passes through the support (8) and is collected by the objective (7).

The fluorescent light passes through or by the mirror (5) depending upon the embodiment of the mirror. When the mirror (5) is a dichroic, significant rejection of laser illumination is contributed by this mirror. This rejection will reduce the blocking requirements of optical filters (11) and (14).

The fluorescent light passes through an optional dichroic mirror (10). This mirror is used to insert the beam from the autofocus system (not shown) into the optical path.

Laser Line Rejection Filter

The fluorescent light passes through a suitable optical filter (11) that efficiently transmits the fluorescent light and blocks the wavelength of the excitation laser. The filter is optionally tilted about an axis perpendicular to the plane of FIG. 1 so that reflections from the filter are outside of the field of view of the camera (16).

If multiple filters are used, the actuator (12) can be used for filter changing. Preferred embodiments of the actuator (12) include, but are not limited to:

A high speed linear slider. This is the preferred embodiment when filter (11) is one of 3 to ~6 filters.

A two-state high speed (<25 msec) actuator. This is the preferred embodiment when filter (11) is one of two filters.

No actuator. This option applies for cases where there is a single filter (11), or when all optical filtering is preformed by emission filter (14).

Preferred embodiments of the filter (11) include, but are not limited to a Rugate notch filter. Multiple Rugate filters can be installed in the system. Each of these filters may have multiple narrow and highly-reflective bands that correspond to excitation laser wavelengths. Amongst the filters installed in the system there is at least one filter that will efficiently reflect the light emitted by every excitation laser installed in the system. Other preferred embodiments include:

Set of single band Rugate filters.

A multi-wavelength Rugate notch filter. Several narrow and highly reflective bands that correspond to the wavelengths of all of the excitation lasers mounted on the system.

Combinations of different types of filters. Such combinations are known to those skilled in the art.

No filter. This option is applicable when all optical filtering is performed by filter (14).

In a preferred embodiment the filter (11) will not vignette the fluorescence emission.

Tube Lens

The fluorescent light passes through the image-forming lens (13).

In a preferred embodiment:

The geometrical distortion of the lens is very low (<0.2%) across the region imaged by the camera (16).

The lens is corrected for all other geometrical and chromatic aberrations.

A high-quality medium-telephoto photographic lens will likely be suitable.

Emission Filters

The fluorescent light passes through a suitable optical filter (14) controlled by an optional actuator (15). This filter efficiently transmits the fluorescent light and attenuates the light at other wavelengths.

Potential embodiments of the filter (14) include, but are not limited to:

A linear variable filter e.g. Schott Veril filter. The lines of constant optical pass-band are oriented parallel to the line-shaped illumination area. This is the preferred embodiment. This filter can be moved in synchronization with the moving excitation beam to provide constant optical bandwidth during image acquisition.

Standard, dye-specific fluorescence filters.

No filter. This option is applicable when all optical filtering is performed by the laser line rejection filter (11).

In a preferred embodiment the filter (14) will not vignette the fluorescence emission.

Optical Detector

As described previously, preferred detectors include CMOS and CCD detectors which are capable of detecting the fluorescent light and generating an image. In preferred embodiments of the invention the detector is capable of an independent reset and readout of pixels (random access feature).

In a preferred embodiment the fluorescent emission is focused onto a CMOS detector (16) having a rolling shutter (also known as a focal-plane shutter). For a description of the operation of this type of camera refer to the Application Note MTD/PS-0259 Shutter Operations for CCD and CMOS Image sensors published by Eastman Kodak Company, incorporated herein by reference.

In the line scan mode, the laser is focused to a uniformly illuminated line oriented parallel to the rows of the CMOS detector. There are control mechanisms in place (described above) that keep this line accurately centered on the area of the sample that is imaged onto the rolling shutter of the CMOS camera. This line moves as the rolling shutter moves across the camera. In this way the fluorescence emission generated by the line of illumination is collected by the sensor.

The imager of this invention can basically be operated in two modes, sequential and simultaneous multi wavelength imaging, as described below.

Operation of a Preferred System

In general operation, one or plurality of targets including one or plurality of fluorescent markers will be imaged by the imaging apparatus as follows.

1. Electromagnetic radiation from one or plurality of optical sources having emission spectra at least partially overlapping with absorption bands of the fluorescent markers is directed at the target and a beam-shaping optical system is utilized to control the shape of an illumination zone on the subject that may have a shape of a point, a line, a circle and a rectangle. The target is illuminated through an illumination optical system to form an illumination zone which covers whole imaging area or a part of it.

2. Fluorescent emission is then collected from the fluorescent markers located within the illumination zone using a light collection system that can be the same or different with the illumination system and the fluorescent emission is filtered using longpass, bandpass, or liner variable optical filters.

3. One or plurality of two-dimensional pixel-based optical receivers (detectors) that are capable of an independent reset and readout of pixels (random access feature) are placed in a position optically conjugated to the imaging area and the shape and the size of the detection area within the optical detector is adjusted to be equal or smaller than an image of optically conjugated illumination zone. The fluorescent emission that is delivered to the detection area of the optical receiver is detected by reading the signals from the pixels located within the detection area. The pixels of the optical detector that are located outside of the detection area of the detector are reset in order to (i) reject optical signals received outside of the illumination area such as stray light and out of plane fluorescence; and (ii) to reduce intrinsic detector noise such as thermal noise that otherwise will be accumulated during total image acquisition time.
4. The illumination zone is scanned within the imaging area of the subject using a beam scanning system, and the detection area of the optical receiver is moved to maintain the optical conjugation with the illumination zone using random access to the pixels of the optical detector.
5. An image of the imaging area of the subject is formed from the signals (sub-images) from the detection area of the receiver obtained during the scanning of the illumination zone across the imaging area, and the foregoing steps are repeated for the sequential image acquisition for plurality of optical sources.

Operation of the Imager in a Sequential Imaging Mode

In the sequential mode the fluorescent images are acquired in a sequence, using one-fluorophore-at the time approach.

In the sequential mode, the Imaging System of this invention will be operated as follows:

The target (9) is moved into an imaging position using an X-Y stage. Excitation radiation from the desired optical source is then focused on the target to produce a fluorescent emission.

The position of the objective (7) is then adjusted for optimal focus manually and/or using the autofocus system.

The detector (16) is actuated to initiate the exposure. The key acquisition parameters are the width of the rolling shutter and the speed at which the rolling shutter "moves" across the camera.

As the rolling shutter moves across the camera (16) the tilt of the mirror (5) is adjusted so that the position the line of excitation laser light remains in the middle of the rolling shutter area. If filter (14) is a linear variable filter, then the position of this filter must also be changed during exposure to keep the position of the filter synchronized with the rolling shutter of the camera.

Operation of the Imager in a Simultaneous Multi Wavelength Imaging Mode

In the simultaneous multi wavelength imaging mode the imaging system is configured to capture multiple fluorescent images simultaneous.

One of the major problems for design of a simultaneous multi wavelengths confocal microscope is the limited range of chromatic aberration correction for a microscope objective. It means that:

1. For illumination optical path—an illumination area (point or a line) will be in focus for the excitation lines that are within the spectral range of chromatic aberration correction of the objective, and the an illumination area for the excitation wavelength that lies outside of corrected spectral range (typically in UV range) will be out of focus.
2. For emission optical path—the images of fluorescent targets that emit a light in a corrected range will be in focus, but images of the fluorescent targets with emission that is in a spectral range far from a corrected will be out of focus.

These problems are well known in the art.

To accomplish simultaneous imaging using multiple lasers or other light sources, and sub grouping said wavelengths is proposed. These sub groups are selected such that the chromatic aberration of a microscope objective for each sub-group of the excitation wavelengths will be within acceptable range.

In a preferred embodiment a system requires fluorescent imaging at 670, 638, 532, 488, 405, and 374 nm excitation wavelengths. The total wavelengths range of ~300 nm (from 670 nm to 357 nm) is much wider than a corrected spectral range of a typical microscope objective and, therefore, simultaneous "in focus" imaging at all these wavelengths is not possible. However, these wavelengths can be grouped into several sub-groups such as:

Red group (670 and 638 nm, 32 nm range)
Blue-Green group (532 and 488 nm, 44 nm range)
UV group (405 and 375 nm, 30 nm range)

The spectral range of the excitation wavelengths within each sub-group is much narrower (<40 nm) and the simultaneous "in focus" imaging at the sub-group wavelengths becomes possible.

A number of optical detectors in such a system should be equal to the number of wavelengths in a sub-group.

Figure 2:
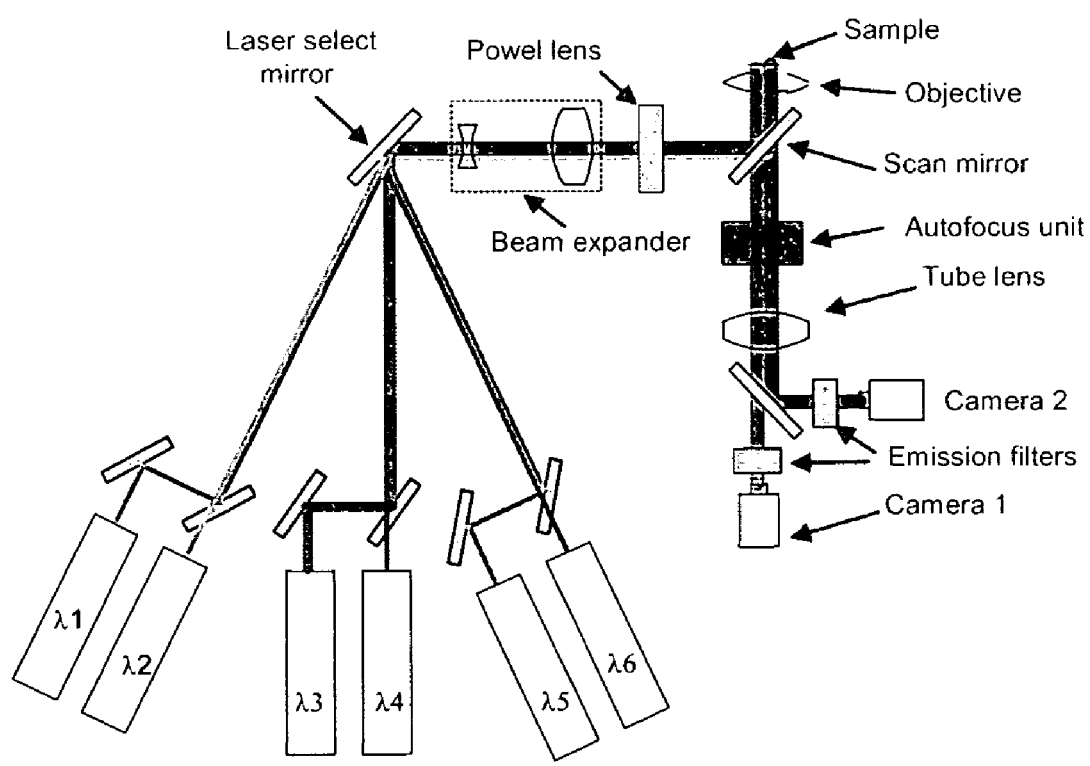
FIG. 2 presents a schematic diagram of a multiple wavelength apparatus of this invention.

FIG. 2 shows an optical configuration of the system that demonstrates this approach for simultaneous imaging at two wavelengths using three sub-groups.

The system is using six laser excitation sources that are divided into three sub-groups of two wavelengths each. The laser beams of the lasers in each sub-group are optically merged using one of the following methods:
polarization beam combiner,
dichroic beam combiner
fiber optic beam combiner.

The system operates as follows:

1. An optical switch based on laser selection mirror or any other suitable technique couples the combined beam from a selected sub-group into the optical system.
2. The combined beam passes a beam-forming optics (beam expander and Powell lens), gets reflected from a scanning mirror, passes the microscope objective and is focused on a specimen.
3. The excitation light is scanned across the specimen by moving the scanning mirror.
4. Excited fluorescent emission is collected by the microscope objective.
5. The image of the fluorescent targets is formed by a tube lens.
6. The fluorescent emission is split by two channels by a dichroic mirror.
7. The fluorescent emission in each channel is passing an emission filter. A laser line rejection filter can be added there in order to improve signal-to-noise ratio.
8. The fluorescent image in each channel is captured by an optical detector such as a CMOS camera.
9. Both detectors are synchronized with the scanning mirror.
10. Each detector acquires the image in a way described in other part of the patent application ("rolling shutter" mode)
11. The same procedure is repeated for each sub-group.
12. Following adjustments of the system has to be performed before imaging of each sub-group:
a. Beam forming optics should be adjusted for a sub-group center wavelength.
b. Microscope objective focal position should be adjusted for a sub-group center wavelength.
c. Proper dichroic mirror should be inserted into the optical path.
d. Proper emission filters should be installed into each imaging channel.

It is apparent that many modifications and variations of the invention as hereinabove set forth may be made without departing from the spirit and scope thereof. The specific embodiments described are given by way of example only, and the invention is limited only by the terms of the appended claims.

What is claimed is:

1. In an apparatus for confocal fluorescent microscopy comprising:
   at least one optical source which provides excitation radiation to an illumination area on a target and at least one detector which detects fluorescent emission from the target;
   wherein the at least one optical source includes a line forming means to illuminate a line portion of the target; and
   the at least one detector is capable of random access reading of said fluorescence emission wherein a region of interest of the at least one detector is configured to be optically conjugated with the illumination area of the line portion of the target and said region of interest is moving in synchronization with the illumination area on the target.

2. The apparatus of claim 1, wherein said at least one optical source is selected from the group consisting of lasers, laser diodes, light emitting diodes, lamps, and combinations thereof.

3. The apparatus of claim 2, wherein said optical source includes two or more lasers.

4. The apparatus of claim 3, wherein the lasers emit at different wavelengths.

5. The apparatus of claim 1, wherein said at least one detector includes one or more two dimensional pixel-based optical receivers capable of independent reset and readout of such pixels.

6. The apparatus of claim 5, wherein the at least one detector includes a CMOS detector.

7. The apparatus of claim 1, wherein the line forming means is selected from the group consisting of Powell lenses, cylindrical lenses, diffraction gratings, holographic elements, and combinations thereof.

8. The apparatus of claim 1, wherein the line forming means produces a line of light on the target which is moved across the target by one or more beam deflecting devices.

9. The apparatus of claim 2, wherein said radiation is from more than one or more sources and said radiation from said one or more sources is coupled to provide illumination of the target by an optical selection device selected from the group consisting of dispersive prisms with optical shutters, reflective gratings with optical shutters, dichroic mirrors with optical shutters, fiber optic switches, and rotating mirrors.

10. The apparatus of claim 8, wherein the beam deflecting devices include one or more galvanometers.

11. The apparatus of claim 8, wherein the at least one detector is a CMOS detector which further comprises a rolling shutter means.

12. The apparatus of claim 11, wherein the rolling shutter means has a width of less than or equal to the width of the image of the line on the target.

13. The apparatus of claim 12, wherein the rolling shutter means is optically conjugated to the line on the target.

14. The apparatus of claim 11, wherein reading of said fluorescent emission is synchronized with the scanning of said area illuminated.

15. The apparatus of claim 1, wherein the target includes one or more fluorescent markers.

16. The apparatus of claim 1, wherein the target is on a microscope slide or a microtiter plate.

17. The apparatus of claim 1, further comprising a mirror centered on the rear of an objective to couple the excitation light into the illumination and to scan said illumination area across the target.

18. The apparatus of claim 8, further comprising one or more optical filters in front of the at least one detector which efficiently transmit light at the emission wavelength of the target and reflect or attenuate light at the excitation wavelength of the target.

19. The apparatus of claim 18, wherein said one or more filters are linear variable filters.

20. A method of obtaining an image of a target comprising:
    providing an optical source that provides an excitation light;
    scanning said target with the excitation light of a wavelength corresponding to an excitation wavelength of said target;
    collecting fluorescent emission as said excitation light moves across said target;
    providing the optical source with a line forming means to illuminate a line portion of the target;
    providing at least one detector capable of random access reading of the fluorescent emission;
    providing a region of interest of the at least one detector that is configured to be optically conjugated with illumination area on the target and said region of interest is moving in synchronization with the illumination area of the line portion on the target; and
    providing an image of the target on a display.

21. The method of claim 20, wherein said optical source is selected from the group consisting of lasers, laser diodes, light emitting diodes, lamps, and combinations thereof.

22. The method of claim 20, wherein said at least one detector includes one or more two dimensional pixel-based optical receivers capable of independent reset and readout of such pixels.

23. The method of claim 22, wherein said at least one detector includes a CMOS detector.

24. The method of claim 23, wherein the CMOS detector further comprises a rolling shutter means.

25. The method of claim 24, wherein the rolling shutter has a width of less than or equal to the width of the image of a line on the target.

26. The method of claim 24, wherein the rolling shutter is optically conjugated to a line on the target.

27. The method of claim 20, wherein the at least one optical source includes a means to illuminate substantially all of an area to be imaged.

28. The method of claim 20, wherein the line forming means is selected from the group consisting of Powell lenses, cylindrical lenses, diffraction gratings, holographic elements, and combinations thereof.

29. The method of claim 20, further comprising one or more optical filters in front of the at least one detector which efficiently transmit light at the emission wavelength of the target and reflect or attenuate light at the excitation wavelength of the target.

30. The method of claim 29, wherein said one or more filters are linear variable filters.

31. The method of claim 30, wherein said one or more filters are moved to track the movement of said excitation light across said target.

32. The method of claim 20, wherein the target is a on a microscope slide or a microtiter plate.

33. A method of imaging a subject including one or more of targets marked by one or more fluorescent markers, said method comprising:
   a. emitting an electromagnetic radiation from one or more optical sources having emission spectra at least partially overlapping with absorption bands of the fluorescent markers;
   b. applying a beam-shaping optical system to control a shape of an illumination zone on a subject having a shape of a line;
   c. collecting fluorescent emission from the fluorescent markers located within the illumination zone on the subject using a light collection system that can be the same or different with the illumination system;
   d. placing one or more two-dimensional pixel-based detectors that are capable of an independent reset and readout of pixels in a position optically conjugated to the imaging area;
   e. adjusting the shape, the size and location of the region of interest within the optical detector to be equal or smaller than an image of optically conjugated illumination zone of the subject;
   f. detecting the fluorescent emission that is delivered to the region of interest of the detector by reading the signals from the pixels located within the region of interest;
   g. resetting the pixels of the detector that are located outside of the region of interest of the detector that are not optically conjugated with the illumination zone;
   h. scanning the illumination zone within the imaging area of the subject using a beam scanning system;
   i. moving the region of interest of the detector to maintain the optical conjugation with the illumination zone using random access to the pixels of the optical detector;
   j. forming an image of the imaging area of the subject from the signals (sub-images) from the region of interest of a receiver obtained during the scanning of the illumination zone across the imaging area;
   k. repeating the method from step (a) for plurality of optical sources for the sequential image acquisition for plurality of optical sources; and
   l. providing the imaging area on a display.

34. The method of claim 33, further comprising one or more fluorescent markers, said method comprising:
   filtering the fluorescent emission using longpass, bandpass, or linear variable optical filters.

35. The method of claim 33, wherein said at least one optical source is selected from the group consisting of lasers, laser diodes, light emitting diodes, lamps, and combinations thereof.

36. The method of claim 33, wherein said one or more detectors is selected from the group consisting of CMOS detectors and CCD detectors.

37. The method of claim 33, wherein the target is on a microscope slide or a microtiter plate.

* * * * *